(12) United States Patent
Tessmann et al.

(10) Patent No.: US 10,887,033 B1
(45) Date of Patent: Jan. 5, 2021

(54) LIVE DECOMPOSITION OF MIXED AUDIO DATA

(71) Applicant: ALGORIDDIM GMBH, Munich (DE)

(72) Inventors: Federico Tessmann, Munich (DE); Kariem Morsy, Munich (DE); Christoph Teschner, Munich (DE)

(73) Assignee: ALGORIDDIM GMBH, Munich (DE)

( * ) Notice: Subject to any disclaimer, the term of this patent is extended or adjusted under 35 U.S.C. 154(b) by 0 days.

(21) Appl. No.: 16/888,189

(22) Filed: May 29, 2020

Related U.S. Application Data (63) Continuation of application No. PCT/EP2020/062151, filed on Apr. 30, 2020.

(30) Foreign Application Priority Data

Mar. 6, 2020 (EP) .................................. 2020/056124
Mar. 17, 2020 (EP) .................................. 2020/057330

(51) Int. Cl.
*H04B 1/00* (2006.01)
*H04H 60/04* (2008.01)
*G06F 3/16* (2006.01)

(52) U.S. Cl.
CPC ............. *H04H 60/04* (2013.01); *G06F 3/165* (2013.01)

(58) Field of Classification Search
CPC ...................................................... G06F 3/165
USPC .............................. 381/71.1, 94.1, 94.5, 119
See application file for complete search history.

(56) References Cited

U.S. PATENT DOCUMENTS 5,267,322 A * 11/1993 Smith .................. H03G 3/3026
375/345
2020/0066296 A1 2/2020 Sargsyan et al.

OTHER PUBLICATIONS

Coldewey, Krisp reduces noise on calls using machine learning, and it's coming to Windows soon, Dec. 10, 2018, Tech Crunch.*
2Hz, Krisp Noise Cancellation Application Launches for Windows and Mac OS Delivering Privacy and Productivity During Calls, Jun. 12, 2019, Cision.*
Pretet et al., "Singing Voice Separation: A Study on Training Data", IEEE, 2019, pp. 506-510.
Kim et al. "A Real Time Singing Voice Removal System Using DSP and Multichannel Audio Interface", International Journal of Multimedia and Ubiquitous Engineering, vol. 7, No. 2, Apr. 2012, pp. 457-462.
Defossez et al., "Music Source Separation in the Waveform Domain", arXiv.org > cs > arXiv:1911.13254, Nov. 27, 2019, pp. 1-15.

* cited by examiner

*Primary Examiner* — Katherine A Faley
(74) *Attorney, Agent, or Firm* — Kilpatrick Townsend & Stockton LLP (57) ABSTRACT

The present invention relates to a method and a device 10 for processing mixed audio data, including decomposing in real-time with low latency, in which a continuous stream of mixed audio data is received from an audio source 14, a first chunk of the stream of mixed audio data is loaded into a buffer, the audio data contained in the buffer is decomposed to obtain first decomposed audio data representing audio signals of a predetermined timbre, and a first chunk of output data is obtained from the first decomposed audio data, preferably for direct playback via speaker 26.

21 Claims, 7 Drawing Sheets

LIVE DECOMPOSITION OF MIXED AUDIO DATA

CROSS REFERENCE TO RELATED APPLICATION

This application is a continuation of International Patent Application No. PCT/EP2020/062151, filed on Apr. 30, 2020, which claims the benefit of International Patent Application No. PCT/EP2020/057330, filed on Mar. 17, 2020, which claims the benefit of International Patent Application No. PCT/EP2020/056124, filed on Mar. 6, 2020 each of which is incorporated by reference herein in its entirety.

The present invention relates to a method and a device for processing mixed audio data, wherein a continuous stream of mixed audio data is received and processed to generate output data, in particular for direct playback.

Methods and devices of this type are known from various applications, for example sound systems for live entertainment through public address systems (PA systems). Usually, a stream of mixed audio data is received as a real-time stream (i.e. live stream) from a live audio source such as a live stream from a concert, or from a playback device such as a vinyl player or a CD player. Conventional equipment processing such continuous streams of mixed audio data are for example professional DJ mixers such as the Pioneer DJ DJM-900NXS2, a digital mixer with built-in components for digital signal processing to allow the insertion of digital audio effects (for example delay, echo, flanger, phaser, etc.) into the live signal. The equipment then plays the processed signal virtually without any latency, i.e. the playback stream output by the equipment has substantially no time delay with respect to the received stream of mixed audio data.

There is a strong desire in the field to explore new techniques for the modification of the incoming stream of mixed audio data that go beyond the currently available audio effects. In particular, audio decomposition techniques have recently gained attraction, especially among DJs. Several decomposing algorithms and services are known in the art, which allow to decompose mixed audio signals to separate therefrom one or more tracks having specific timbres, such as vocal tracks, drum tracks, etc. The use of decomposed tracks and the possibility to mix them with other tracks multiplies the creative freedom to produce new musical compositions from existing mixed audio data. For example, it allows to remove vocals or any other instrumental part from a song or to combine an extracted vocal part or an extracted instrumental part of one song with the sound of another song.

In recent years, there have been several approaches based on artificial intelligence and deep neural networks in order to decompose mixed audio signals to separate therefrom signals of certain timbres. Some AI systems usually implement a convolutional neural network (CNN), which has been trained by a plurality of data sets for example including a vocal track, an instrumental track and a mix of the vocal track and the instrumental track. Examples for such conventional AI systems capable of separating source tracks such as a singing voice track from a mixed audio signal include: Prétet, "Singing Voice Separation: A study on training data", Acoustics, Speech and Signal Processing (ICASSP), 2019, pages 506-510; "spleeter"—an open-source tool provided by the music streaming company Geezer based on the teaching of Prétet above, "PhonicMind" (https://phonicmind.com)—a voice and source separator based on deep neural networks, "Open-Unmix"—a music source separator based on deep neural networks in the frequency domain, or "Demucs" by Facebook AI Research—a music source separator based on deep neural networks in the waveform domain. These tools accept music files in standard formats (for example MP3, WAV, AIFF) and decompose the whole song to provide decomposed/separated tracks of the song, for example a vocal track, a bass track, a drum track, an accompaniment track or any mixture thereof. The tracks may then be stored by the user for audio production, analysis purposes or playback. For example, the conventional AI systems may be used to set up a karaoke machine by removing vocal tracks from professionally produced available songs.

However, the conventional techniques for decomposing mixed audio signals cannot easily be applied in a real-time playback situation in which a continuous stream of mixed audio data is received and in which it has to be continuously processed in the manner similar to a conventional audio effect, such as an echo, filter or reverb, for a continuous, uninterrupted playback of the incoming stream of mixed audio data without a significant delay. In particular, conventional techniques typically preprocess entire audio files or large portions thereof, so it would be necessary to wait until at least such a large portion of the stream of mixed audio data is received, typically requiring at least 5 seconds of audio data (i.e. 220500 audio samples at a sampling rate of 44100 Hz), before the mixed audio data can be loaded into the neural network of the AI system for decomposition. Decomposition then usually takes several tens of seconds, minutes or even longer, depending on the algorithm/neural net, the hardware running the algorithm, the length of the audio portion and the desired quality of the decomposition result. In addition, in most situations where a continuous stream of mixed audio data is received, information about the length of the audio content, i.e. the playback duration, or the entire audio content itself is not available in advance, because the data are transmitted live, e.g. a concert performance transmitted live through the internee, or transmitted from an analog audio source or through an analog signal transmission before it is digitized and analyzed in the equipment. This means that the preprocessing of conventional techniques cannot be applied for such situations.

Even if one conceived to process just segments of the incoming stream of mixed audio data, to then decompose the segments and to obtain segments of output data for enabling a start of playback before the entire audio data are received, there would still be a significant latency between the incoming stream and the playback stream corresponding to at least the playback duration of the segment plus the time required for its decomposition and processing. On the other hand, if the size of the segments were reduced too much in order to reduce latency, the data available for analysis by the decomposition algorithm would become insufficient, which would result in a significant loss in audio quality of the decomposed tracks. In particular, if the length of the segments is below 5 seconds, the audio quality of the decomposed tracks is too low for most applications and will usually not be acceptable. In particular, conventional neural networks require at least 10 to 20 seconds of playable audio data to achieve high-quality decomposition results. This means that a minimum latency for a segment-wise decomposition would still be around 10 seconds plus the time required for decomposition and processing of the individual segments.

In view of the above situation, it is an object of the present invention to provide a method and device for decomposing an incoming stream of mixed audio data to generate playable output data, wherein the output data can be obtained, and in particular played, with high quality with low latency with respect to the incoming stream of mixed audio data.

According to a first aspect of the present invention, the above object is achieved by a method for processing mixed audio data, comprising the steps of receiving a continuous stream of mixed audio data, using an AI system to decompose the data obtained from the stream of mixed audio data to obtain decomposed audio data, playing a stream of output data obtained from the decomposed audio data, wherein playback of the stream of output data is carried out while receiving the stream of mixed audio data is in progress.

According to the first aspect of the invention, a method is provided which allows to process a continuous stream of mixed audio data, wherein the stream is decomposed and playback is started while further chunks of the stream of mixed audio data are being received and processed, i.e. before receiving the stream of mixed audio data is completed. Thus, playback of decomposed audio data is started while still receiving chunks of the continuous stream of mixed audio data, i.e. before all mixed audio data are received in the case of a predetermined length such as for audio files and/or even without any notion of the end of the stream. The AI system is thus operating on data obtained from a continuous stream rather than on an entire audio file, for example an entire song, where all the audio data contained in the audio file is obtained and available for processing, e.g. stored in a local memory, before decomposition. This allows not only to quickly start playback after receiving the stream of mixed audio data has been commenced, but also allows decomposition and playback of decomposed audio data in cases where the size of the audio file or the playback duration of the audio content is unknown or before it is known. Furthermore, the time span between receiving the first audio data and starting playback of decomposed audio data becomes independent from the overall size of the audio file or overall playback duration of the incoming audio signal.

In an embodiment of the invention, a latency between the incoming stream of mixed audio data and the playback of the stream of output data is smaller than 5 seconds, such that the playback of the audio data can still be assumed as a direct playback or live playback which is accepted by users as being live playback associated with the original, incoming stream of mixed audio data. For example, such latency would be suitable for any live broadcasting such as broadcasting a live concert through a radio channel or through the Internet, for example. Preferably, the latency is smaller than 1 second which will make the method suitable for DJs or Radio/TV directors, for example if a stream of mixed audio data is received from an analog playback device such as a vinyl player or from a live recording/transmission of a concert etc. More preferably, the latency is even smaller than 200 milliseconds, such that there is substantially no disturbing latency recognizable by the human ear, and the decomposed signal is audible with virtually the same timing as the incoming stream of mixed audio data which allows a low-latency combination of the incoming stream of mixed audio data with the decomposed audio signal and even blending or cross-fading between the two.

According to a second aspect of the present invention, the above object is achieved by a method for processing mixed audio data, comprising the steps of receiving a continuous stream of mixed audio data, loading a first chunk of the stream of mixed audio data into a buffer, wherein the size of the buffer is larger than the size of the first chunk, decomposing the audio data contained in the buffer to obtain first decomposed audio data representing audio signals of a predetermined timbre, and generating a first chunk of output data obtained from the first decomposed audio data.

According to the second aspect, a chunk of the stream of mixed audio data is loaded into a buffer, which has a size that is larger than the size of the chunk, and the buffer will be decomposed thereafter to generate decomposed audio data. Since the size of the buffer is larger than the size of the chunk, a decomposition algorithm can used which operates on the basis of a relatively large buffer size and therefore in ensures sufficient audio quality, while it is possible, on the other hand, to start decomposition and thus generating output data very quickly, namely as soon as the first chunk of the stream of mixed audio data has been received. It has been found that even if the buffer is only partially filled by only one or a couple of chunks of the stream of mixed audio data, audio quality of the decomposed audio data produced by such algorithms is still acceptable. Furthermore, the decomposition algorithm could start generating output right from the beginning, when only one or two chunks of the stream of mixed audio data are available, e.g. approximately 100 msec, which means that the decomposition algorithm does not need to wait until the buffer is filled, e.g. receiving at least 10 seconds of audio data before being able to start decomposition. As a result, higher quality decomposition can be achieved with much lower latency, for example, in this case a latency improvement by a factor of 100.

According to a further important feature of the second aspect of the present invention, a first chunk of output data is generated from the first decomposed audio data. This means that although the step of decomposing the audio data is carried out on the basis of a buffer having a size larger than that of the first chunk, thus resulting in a segment of decomposed audio data having a size that is larger than the size one would obtain from decomposing just one chunk of the stream of mixed audio data, according to the invention, a first chunk of output data is extracted from that larger segment of decomposed audio data in order to obtain just that part of the decomposed audio data that corresponds to the decomposition of the first chunk. As a result, the output data can be further processed immediately as they represent a decomposition of the first chunk. For example, the first chunk of output data can be immediately played to immediately start playback of the decomposed data at exactly the position that corresponds to the first chunk of the stream of mixed audio data. This means that when the second chunk arrives, the method of the invention generates a second chunk of output data which can be processed, in particular played, directly after the first chunk of output data. The further processing of the output data, in particular playback of the output data, can thus be carried out with only little or even substantially no latency with respect to the incoming stream of mixed audio data. Depending on the hardware and/software performance of the system and the size of the audio buffer used, it may also be preferred to temporarily store two or more of the chunks of output data in an additional memory section, before creating a playback stream and routing it to a playback unit.

Preferably, a second chunk of the stream of mixed audio data is loaded into the buffer, in particular as soon as the second chunk arrives, such that the audio data contained in the buffer then include the first chunk and the second chunk. The audio data contained in the buffer (i.e. both chunks) are then decomposed to obtain second decomposed audio data, and a second chunk of output data obtained from the second decomposed audio data is then generated. Thus, as soon as a second chunk of the stream of mixed audio data is received, decomposition can be carried out on the basis of two consecutive chunks of the mixed audio data and thus the audio context for the decomposition algorithm is already doubled, which increases decomposition quality significantly.

In this manner, the method of the invention preferably continues by (a) loading an nth chunk of the stream of mixed audio data into the buffer, (b) providing the buffer such that the audio data contained in the buffer include the nth chunk and a plurality of previous chunks, (c) decomposing the audio data contained in the buffer to obtain nth decomposed audio data, (d) generating an nth chunk of output data obtained from the nth decomposed audio data that corresponds to the decomposition of the nth chunk of the stream of mixed audio data, and (e) repeating steps (a) to (d) to successively fill the buffer with consecutive chunks of the stream of mixed audio data, decompose the buffer and generate a continuous stream of output data.

In this manner, a suitable number of consecutive chunks of the stream of mixed audio data can successively be loaded into the buffer to successively increase the audio context on which the decomposition algorithm is allowed to operate. With each chunk arriving in the buffer, the decomposition quality will increase until it reaches a high level of quality. Consequently, even if the decomposition quality might be limited as long as only the first or a few chunks of the stream of mixed audio data are loaded into the buffer, such low quality is only present during a very short amount of time at the beginning of the stream of output data. If the output data are directly played, this means that only at the very beginning of the playback there might be a small reduction in audio quality. This is however overcompensated by the advantage that the playback may start immediately, while audio quality increases rapidly. By choosing a suitable size of the chunks and a suitable buffer size and by using high-performance hardware systems as well as decomposition algorithms, it will then be possible to further process or start playback of the output data substantially immediately, i.e. without any recognizable delay, and the audio quality will be on a high level by the time the user is actually able to react and make a reasonable judgment about it.

At the beginning of the processing, when the buffer is only partially filled, it has turned out that audio quality of the decomposed output data can be improved when the remainder of the buffer is filled with predetermined reference data. This means that the audio data contained in the buffer then consist of the first chunk or a number of consecutive chunks of the stream of mixed audio data, and predetermined reference data. Such predetermined reference data are identified by the decomposition algorithm, for example can be recognized by the algorithm as reference data and not belonging to the stream of mixed audio data, or will not affect the decomposition (for example zeros or silence). This avoids erroneous contributions to the decomposed audio data. In all aspects and embodiments of the present invention, predetermined reference data are generally reference data which are predetermined and independent from the stream of mixed audio data. Reference data may in particular consist of equal data, preferably zeros or they represent a neutral audio signal, in particular silence. If the predetermined reference data contain only zeros or an audio signal representing silence, these data will a priori not erroneously contribute to the decomposed output data.

In a preferred embodiment of the present invention, the buffer is a First-In-First-Out-buffer (FIFO buffer) which is sequentially filled to form a queue of data, said queue having constant length, wherein data are enqueued at the tail of the buffer, while data are dequeued at the head of the buffer. Such buffer makes it particularly easy to load consecutive chunks of the stream of mixed audio data in a sequence as they arrive and ensures that the buffer always contains the latest chunks of the stream. Moreover, if the buffer is initially filled with predetermined reference data, the FIFO buffer ensures that the first chunks of the stream of mixed audio data may successfully be enqueued while keeping the remainder of the buffer filled with the reference data, wherein the reference data are successively dequeued with each newly arriving chunk of the stream of mixed audio data.

In particular, such a method using a FIFO buffer may comprise the following steps:

(a) filling the buffer with predetermined reference data, (b) enqueuing, a first chunk of the stream of mixed audio data at the tail of the buffer, (c) decomposing the audio data contained in the buffer to obtain first decomposed audio data representing audio signals of a predetermined timbre, (d) generating a first chunk of output data obtained from the first decomposed audio data, (e) enqueuing a second chunk of the stream of mixed audio data at the tail of the buffer, (f) decomposing the audio data contained in the buffer to obtain second decomposed audio data representing audio signals of the predetermined timbre, (g) generating a second chunk of output data obtained from the second decomposed audio data, and (h) repeating steps (e) to (g) for a third to an nth chunk (wherein n is a natural number) of the stream of mixed audio data to obtain third to nth chunks of output data, respectively.

As mentioned above, it is an advantage of the present invention to be able to generate chunks of output data which can be further processed and in particular played directly and in particular that such chunks of output data can be generated for each individual incoming chunks of the stream of mixed audio data. This can be utilized in practice by starting playback of the generated first, second or nth chunk of output data within a time smaller than two seconds, preferably smaller than 500 milliseconds, more preferably smaller than 100 milliseconds, after generation of the respective chunk.

The size of the chunks (their data size or playback duration) as well as the size of the buffer (i.e. the number of chunks that can be stored within the buffer) may be suitably chosen based on the performance of the hardware and the software used for implementation of the method of the present invention, such as to achieve a desired performance as regards latency and audio quality.

The size of the chunks can preferably be taken at least as long as each decomposition step takes on the given hardware and software, preferably 50 percent more such as to compensate for resource shortage. For example, on hardware containing a dedicated neural processing unit it might take 10 milliseconds to decompose the buffer. In such example any chunk size longer than 10 milliseconds, preferably 15 milliseconds would be preferred. The buffer size may be chosen as suitable for the AI system used. For example, if the AI system operates based on audio segments of 10 seconds, the buffer could be arranged to store 100 chunks of 100 milliseconds each, for example.

Preferably, the settings are chosen such that playback of the generated first, second or nth chunk of output data may be started within a time smaller than two seconds, preferably smaller than 500 milliseconds, more preferably smaller than 100 milliseconds, after loading or enqueuing the corresponding first, second or nth chunk of the stream of mixed audio data into the buffer, respectively. If the time is smaller than two seconds, the playback of the audio data can still be assumed as a direct playback or live playback which is accepted by users as being live playback. For example, such latency would be suitable for any live broadcasting such as broadcasting a live concert through a radio channel or through the Internet, for example. A latency smaller than 500 milliseconds will make the method suitable for DJs, for example if a stream of mixed audio data is received from an analog playback device such as a vinyl player. If the latency is smaller than 100 milliseconds, there is substantially no disturbing latency recognizably by the human ear, and the decomposed output data can be used with virtually the same timing as the incoming stream of mixed audio data which provides a maximum of flexibility for a user to blend/crossfade between different audio tracks and different streams of audio data, including the original, incoming stream of mixed audio data, or combining such streams to achieve certain effects.

Decomposing the mixed audio data to obtain the decomposed audio data may be realized by any algorithm, filtering, effect application or other processing that is capable of separating an audio signal of a specific timbre (for example a vocal part) from the mixed audio data. The separated audio signal may correspond or be acoustically similar or equal to one or more source tracks of the original audio material that was mixed-down earlier to obtain the mixed audio data. For example, decomposing may include calculation of a frequency spectrum, for example by using a Fourier transformation algorithm, filtering the frequency spectrum to extract frequencies belonging to a certain component of the mixed input data, in particular a vocal component, and retransforming the extracted frequencies, for example by using an inverse Fourier transformation, to obtain decomposed audio data.

In preferred embodiments of the present invention, decomposing the mixed audio data includes processing the mixed audio data by an AI system (artificial intelligence system), said AI system preferably being based on at least one deep neural network, for example a convolutional neural network (CNN), and/or being trained by a plurality of sets of training audio data. Each set of training audio data may at least include a first source track, for example a vocal track, a mixed track being a sum signal obtained from mixing at least the first source track with a second source track, for example an instrumental track.

The use of an AI system allows high quality decomposing of the mixed input data to clearly separate signal components of specific timbres or to generate decomposed tracks that very closely resemble original source tracks or sum signals of less than all original source tracks. An AI system may be provided and trained by audio data obtained from mixed signal recorded from different instruments/vocals, or by audio data of professionally produced songs obtained from one or more record labels and/or music production companies or one or more music distribution/streaming companies or a cooperation between them. For the purpose of training the AI system, the recording company may not only provide the mixed audio file of a certain recording but also one or more training source tracks which are included in the mixed track and which are obtained from the original material of the production process, i.e. the audio data of individual tracks or sums of less than all tracks used in the mixing process. After training the AI system with a large number of sets of training audio data, the AI system will be able to generate a decomposed track from an unknown mixed track (for example a new audio file or stream) that has not been analyzed before during the training phase. For example, the AI system may be based on one of the above-mentioned conventional AI systems (e.g. spleeter, Open-Unmix, Demucs).

Preferably, an AI system used in embodiments of the present invention is shift invariant, which means that a shift of n samples (time interval X) in the input data introduced into the AI system generates an equal shift of n samples (the same time X) in the output data obtained from the AI system. This may simplify the generation of a continuous output stream from the individual chunks of output data and to preserve the timing of the incoming mixed audio data.

In embodiments of the present invention one or more AI systems may be fully stored and operating within a random access memory (RAM) of a device, such as to reduce the time required for decomposing the mixed audio data and even allow nearly latency-free operation in a live situation, such as in a DJ device.

In embodiments of the present invention an AI system may be used to decompose the data obtained from the stream of mixed audio data to obtain decomposed audio data representing audio signals of a predetermined timbre. In particular, the mixed audio data may represent an audio signal which is a mixture of different timbres and the AI system may be used to decompose the data obtained from the stream of mixed audio data to obtain decomposed audio data representing an audio signal of a predetermined timbre selected from the different timbres of the mixed audio data. In other words, the AI system may separate or isolate a predetermined timbre that was originally included within the mixed audio signal of the mixed audio data. This grants a user access to components of the mixed audio data, for example original instrumental components, vocal components etc, which were used to compose the original mixed audio data and which would normally not be separately accessible anymore at the stage of receiving the mixed audio data.

In the context of the present disclosure and in particular all aspects and embodiments of the present invention, the term "timbre" refers to a component of an audio signal that originates from a specific sound source such as a specific musical instrument, software instrument or sample, a specific voice etc. In particular, a certain timbre may refer to at least one of:
  a recorded sound of a certain musical instrument (such as bass, piano, drums (including classical drum set sounds, electronic drum set sounds, percussion sounds), guitar, flute, organ etc.) or any group of such instruments;
  a synthesized sound which has been synthesized by an analog or digital synthesizer, for example to resemble the sound of a certain musical instrument (such as bass, piano, drums (including classical drum set sounds, electronic drum set sounds, percussion sounds), guitar, flute, organ etc.) or any group of such instruments;
  a sound of a vocalist (such as a singing or rapping vocalist) or a group of such vocalists;
  any combination thereof.

These timbres relate to specific frequency components and distributions of frequency components within the spectrum of the audio data as well as temporal distributions of frequency components within the audio data, and they may be separated through an AI system specifically trained with training data containing these timbres.

It is further noted that in the context of the present disclosure, mixed audio data are representative of an audio signal obtained from mixing a plurality of source tracks of different timbres, in particular during music production. Thus, mixed audio data are obtained from a previous mixing process that has been completed before the start of the processing according to the methods of the present invention. In other words, the methods of the invention use mixed audio data from a previous mix-down process, separate from the processing of the present invention. In particular, the mixed audio data may be audio files or audio signal, for examples audio files/signals containing a piece of music that has been produced in a recording studio by mixing a plurality of source tracks. For example, a first source track may be a vocal track obtained from recording a vocalist via a microphone, while a second source track may be an instrumental track obtained from recording an instrumentalist via a microphone or a direct line signal from the instrument. Usually, a plurality of vocal tracks and/or a plurality of instrumental tracks are recorded at the same time or one after another. The plurality of source tracks are then transferred to a mixing station in which the source tracks are individually edited, various sound effects are applied to the source tracks, individual volume levels are assigned and preferably one or more mastering effects are eventually applied to the sum of all tracks. At the end of the production process, the final audio mix is stored on a suitable recording medium, for example on a vinyl record, on a CD, or is stored as an audio file on a hard drive of a computer. Alternatively, mixed audio data according to the present disclosure may be obtained from live recording or live mixing of a plurality of audio signals of different timbres such as, for example, during a live concert of live combos. For example, a first signal may be obtained from recording a vocalist via a microphone, while a second signal may be obtained at the same time from recording an instrumentalist via a second microphone or via a direct line signal from that instrument. During the live concert, the plurality of signals may then be routed via audio cables or wireless audio signal transmission to a mixing station such as a front-of-house mixer, where they are combined to form a sum signal which is sent to the PA system of the concert hall to be audible by the audience. The same or a modified sum signal may at the same time be provided by the mixer to form mixed audio data in the sense of the present disclosure, which may be transmitted through a suitable cable or a wireless network as a continuous real-time stream of mixed audio data for further processing by using methods and devices of the present invention.

According to a third aspect of the present invention, the above-mentioned object is solved by a device for processing mixed audio data, comprising an input unit for receiving a continuous stream of mixed audio data, a decomposition unit configured for decomposing data obtained from the continuous stream of mixed audio data to obtain decomposed audio data, and a playing unit for playing, a continuous stream of output data obtained from the decomposed audio data, wherein the device is adapted to carry out playback of the stream of output data while receiving the stream of mixed audio data is in progress.

According to the third aspect of the present invention, an AI system is integrated in a device which is capable of receiving a continuous stream of mixed audio data and playing a continuous stream of output data. Receiving audio data, decomposing audio data and playing decomposed audio data can therefore be realized by a single device, wherein the device is capable of playing the decomposed audio data while continuously receiving further incoming data. Such a device may therefore be regarded as being capable of decomposition on the fly, making decomposed audio data available shortly after the start of the incoming stream of mixed audio data and independent from the length of an audio file or the total duration of the received incoming audio signal. For the reasons as mentioned above for the first aspect of the present invention, it is preferred that a latency of the playback of the stream of output data with respect to the incoming stream of mixed audio data is smaller than 5 seconds, or even smaller than 1 second or even smaller than 200 milliseconds. Since the present invention operates on the basis of a continuous stream of mixed audio data, the latency may be especially independent from the size of the audio file or the total duration of the received incoming audio signal.

According to a fourth aspect of the present invention, the above-mentioned object is solved by a device for processing mixed audio data, comprising an input unit for receiving a continuous stream of mixed audio data, a buffer for storing consecutive chunks of the stream of mixed audio data, wherein the size of the buffer is larger than the size of each of the chunks, a decomposition unit configured for decomposing the data contained in the buffer to obtain decomposed audio data representing audio signals of a predetermined timbre, and an output unit connected to the decomposition unit for generating consecutive chunks of output data obtained from the decomposed audio data.

The device of the fourth aspect of the invention includes a buffer storing at least one chunk of an incoming continuous stream of mixed audio data, wherein the size of the buffer is larger than the size of each of the chunks, and wherein output data are obtained each time a chunk is loaded into the buffer and the buffer is decomposed. Thus, output data are available very fast, i.e. based on the time needed for receiving only one relatively short chunk. At the same time, the audio quality of the decomposed audio data and thus of the output data is relatively high, since the decomposition unit can be operated on the basis of a relatively large buffer. In other words, even if the buffer contains only one or a few chunks at the beginning of the stream, the decomposition unit is always analyzing a relatively large buffer. In particular, the device may be configured to carry out a method of the first or second aspect of the present invention including any of its embodiments as described above, such as to achieve the above-described advantages and effects.

In the context of the present disclosure a buffer is any data structure suitable to store a plurality of data elements. The buffer may be a piece or section of a memory, may be integral part of a neural network of an AI system of the device used for decomposition, or may be any other suitable structure. For example the buffer could be realized by a static or dynamic memory array, a sub network.

In a preferred embodiment, the device may comprise: a segmentation section for extracting consecutive chunks from the stream of mixed audio data, and a reference data section providing predetermined reference data, wherein the segmentation section and the reference data section are configured to fill the buffer with a chunk of the stream of mixed input audio data or with a number of consecutive chunks of the stream of mixed input audio data, and to fill the remainder of the buffer, if any, with predetermined reference data, wherein the predetermined reference data consist of equal data, preferably zeros, or represent a neutral audio signal, in particular silence. This means that according to this embodiment, the buffer is always filled with either one or more consecutive chunks of the continuous stream of mixed audio data, or with predetermined reference data, or with a combination thereof. Thus, right from the beginning, after only one chunk of the stream of mixed audio data has been loaded into the buffer and the remainder of the buffer is filled with predetermined reference data, the output data obtained from decomposition of the buffer can immediately be used, in particular for playback of a chunk of output data, in order to start a continuous stream of output data. This means, that a continuous stream of output data is available with very low latency after the start of the stream of mixed audio data. Even if the first milliseconds or seconds of the stream of output data may have reduced audio quality, the quality is quickly increasing to a high level. The advantage for the user to obtain the stream of output data at an early point in time or even immediately or synchronously with the incoming stream of mixed audio data overcompensates the short drop in audio quality at the very beginning of the stream.

The device of the third or fourth aspect of the invention preferably further comprises a playing unit for playing audio data based on the consecutive chunks of output data, and an audio interface connected to the playing unit for transmitting the played audio data to an internal speaker of the device or to an external sound system. The device is thus a complete functional unit which allows receiving of a continuous stream of mixed audio data as well as outputting a continuous stream of output data, including playback based on a continuous stream of output data with low latency, preferably substantially no latency with respect to the incoming stream of mixed audio data. Such a device may in particular be implemented by any type of electronic control unit running a suitable software, such as DJ equipment, a computer, a tablet computer or a smartphone etc. In particular, standard components, such as input interfaces, network connectivity, audio interfaces, microprocessors, storage means or display means present in standard electronic control units, may be used to set up a device according to the third or fourth aspect of the invention and/or to implement a method of the first or second aspect of the invention.

In a further preferred embodiment of the third or fourth aspect of the present invention, the decomposition unit is configured to decompose the data contained in the buffer to obtain first-timbre decomposed audio data representing audio signals of a predetermined first timbre, and second-timbre decomposed audio data representing audio signals of a predetermined second timbre, different from said first timbre, wherein the output unit is configured to generate output data based on the first-timbre decomposed audio data and the second-timbre decomposed audio data. Such a device allows separating different tracks of different timbres from the stream of mixed audio data, such as a vocal track and a drum track, which may then be further used, for example by a DJ for recombination with other tracks or even other songs, for example. In this respect, the device may further comprise a combination section adapted to combine (mix) first output data obtained from the first-timbre decomposed audio data with second output data obtained from the second-timbre decomposed audio data.

The device may further include a controlling section adapted to be controlled by a user to generate a control input for controlling output of the output data by the output unit. This may allow a user to start or stop playback of one or more tracks of output data, change volumes, mute/unmute an output or apply certain audio effects. If the device is configured to generate first output data obtained from first-timbre decomposed audio data and second output data obtained from second-timbre decomposed audio data, the control input preferably comprises a first control parameter relating to the output of the first output data, and a second control parameter relating to the output of the second output data, such that a user may control contributions of the first and second timbres, respectively, within the output data.

The control input may be a mute/unmute value and/or a volume level desired by a user and associated with the output data or its playback. In particular, the first and second control parameters may be first and second play/mute values and/or first and second volume levels associated with the first and the second output data, respectively. Likewise, control parameters or control input may represent user settings of audio effects.

In another embodiment of the invention, the input unit comprises a branch-off section adapted to branch-off a bypass signal from the stream of mixed audio data, and a bypass arrangement configured to route the bypass signal towards the output unit while bypassing the decomposition unit, wherein the output unit is configured to generate a bypass output signal based on the bypass stream. With such embodiment, not only the output data obtained from decomposition but also the original mixed audio data or any other signal derived therefrom can be provided by the output unit which increases functionality of the device. Preferably, the device further comprises a bypass control section which is controllable to selectively output either the output data obtained from the decomposed audio data or the bypass output signal, or a combination thereof. Preferably there is no time shift between the two signals, i.e. combination of the two signals is sample accurate with respect to the corresponding positions on the time axis to allow seamless transitions or crossfades between the two signals. Depending on the hardware and software configuration and on possible effects applied to the bypass signal, this means that an intentional latency may have to be introduced into the bypass signal to match its timing to that of the output data obtained from the decomposition. For example, an intentional latency may be introduced by outputting audio data representative of silence for the predetermined time corresponding to the intentional latency, before processing the bypass signal for output.

Devices according to embodiments of the present invention may have any combination of features mentioned above for the third and fourth aspects of the invention and/or may be configured to carry out a method having at least one of the features mentioned above for the first and second aspects of the invention. Moreover, methods according to embodiments of the present invention may have any combination of features mentioned above for the first and second aspects of the invention and/or may use a device having at least one of the features mentioned above for the third and fourth aspects of the invention.

The present invention is further explained based on the following embodiments shown in the attached drawings, wherein.

Figure 1:
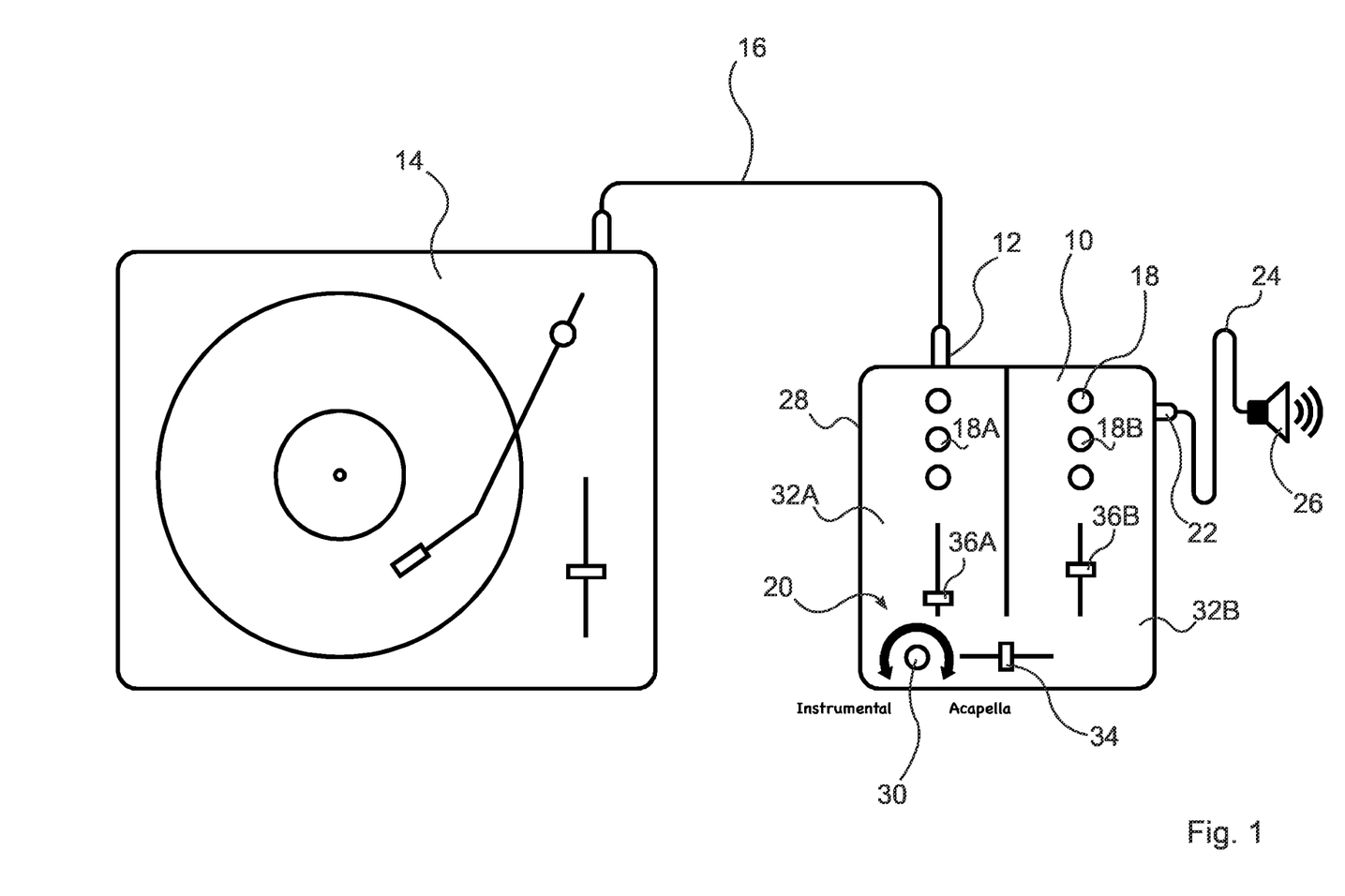
FIG. 1 shows a device according to a first embodiment of the present invention.

A device 10 of the first embodiment may include an input port 12 such as a standard stereo audio input (line-in, XLR, etc.) which allows a connection between device 10 and an external audio source 14 by means of a conventional audio cable 16 or a wireless connection, for example. Audio source 14 might be a vinyl player as shown in FIG. 1 or alternatively any other analog or digital audio source, such as a CD player, a DJ deck, a tape player, a radio, etc. Audio source 14 is adapted to play a continuous stream of mixed audio data in real time, for example a song stored on the vinyl currently placed on the vinyl player or a song stored as an audio file on the memory of a digital DJ deck, which is received by device 10 through input port 12 and, if applicable for receiving analog data, an analog-to-digital converter.

Device 10 may further comprise display means 18 such as a level indicator or a display unit, in order to display information about the status or about a control input of the user. Device 10 may further comprise a controlling section 20 adapted to be controlled by a user to generate a control input for controlling the functions of device 10. In addition, an output port 22 may be provided which is adapted to be connected by an audio cable 24 or by a wireless signal transmission to a PA system 26 such as an amplifier and speakers for spreading sound towards an audience.

Some or preferably all of the above-described components, input port 12, display means 18, controlling section 20 and output port 22 are preferably arranged within or on a common housing 28. In particular, device 10 may be a stand-alone DJ device, a mixer or similar workstation.

According to a feature of the present invention, device 10 includes a decomposition unit which will be described in more detail hereinafter and which allows to decompose the mixed audio data received at input port 12 to obtain one or more decomposed audio data of predetermined timbres. In the example illustrated in FIG. 1, device 10 is configured to extract from the mixed audio data a decomposed vocal track which contains only a vocal part of the mixed audio data, and a decomposed instrumental track which contains only an instrumental part of the mixed audio data, preferably the complement with respect to the decomposed vocal track such that the sum of the decomposed vocal track and the decomposed instrumental track is substantially equal to the original mixed audio data. Controlling section 20 may then have a control element 30 adapted to control a volume level of the decomposed instrumental track and a volume level of the decomposed vocal track (acapella). More preferably, control element 30 is a single control element, such as a single rotatable knob or a single slidable fader, which allows to control both the volume level of the decomposed instrumental track and the volume level of the decomposed vocal track, such as to allow blending between both tracks by a single operational movement of the user.

Device 10 may further be configured as a DJ device comprising a section A 32A receiving a first song, for example via input port 12 from audio source 14, and a section B 32B receiving or providing a second song from any other source, such as from an internal storage device or a second device similar to device 14 mentioned above, via streaming from a network such as from the Internet, or by any other way of transmission. A blend control element 34 may then be provided in controlling section 20 that allows controlling relative volume levels of sections A and B (32A, 32B) and in particular smoothly crossfading between the first song and the second song. Furthermore, level indicators 18A and 186 may separately be provided for each of the sections A and B (32A, 32B). In addition, each of the sections A and B (32A, 32B) may comprise individual control elements 36A and 36B, respectively, in order to allow controlling playback of each of the sections A and B (32A, 32B) separately, for example to control individual, volume levels, etc.

A combination section (not illustrated in FIG. 1) may be included in device 10 which allows combining the decomposed instrumental track, the decomposed vocal track and audio signals from each of the sections A and B (32A, 32B) in accordance with the settings of the controlling section 20. Output generated by the combination section in this manner will then be forwarded to output port 22 for playback.

As will be described later on, device 10 is adapted to receive a continuous stream of mixed audio data in real time from audio source 14 and to send output data via port 22, which includes contributions from decomposed tracks such as the decomposed instrumental track or the decomposed vocal track according to the settings of controlling section 20, wherein the output port 22 provides a continuous stream of output data with only a small or even substantially no latency with respect to the incoming stream of mixed audio data received at input port 12.

Figure 2:
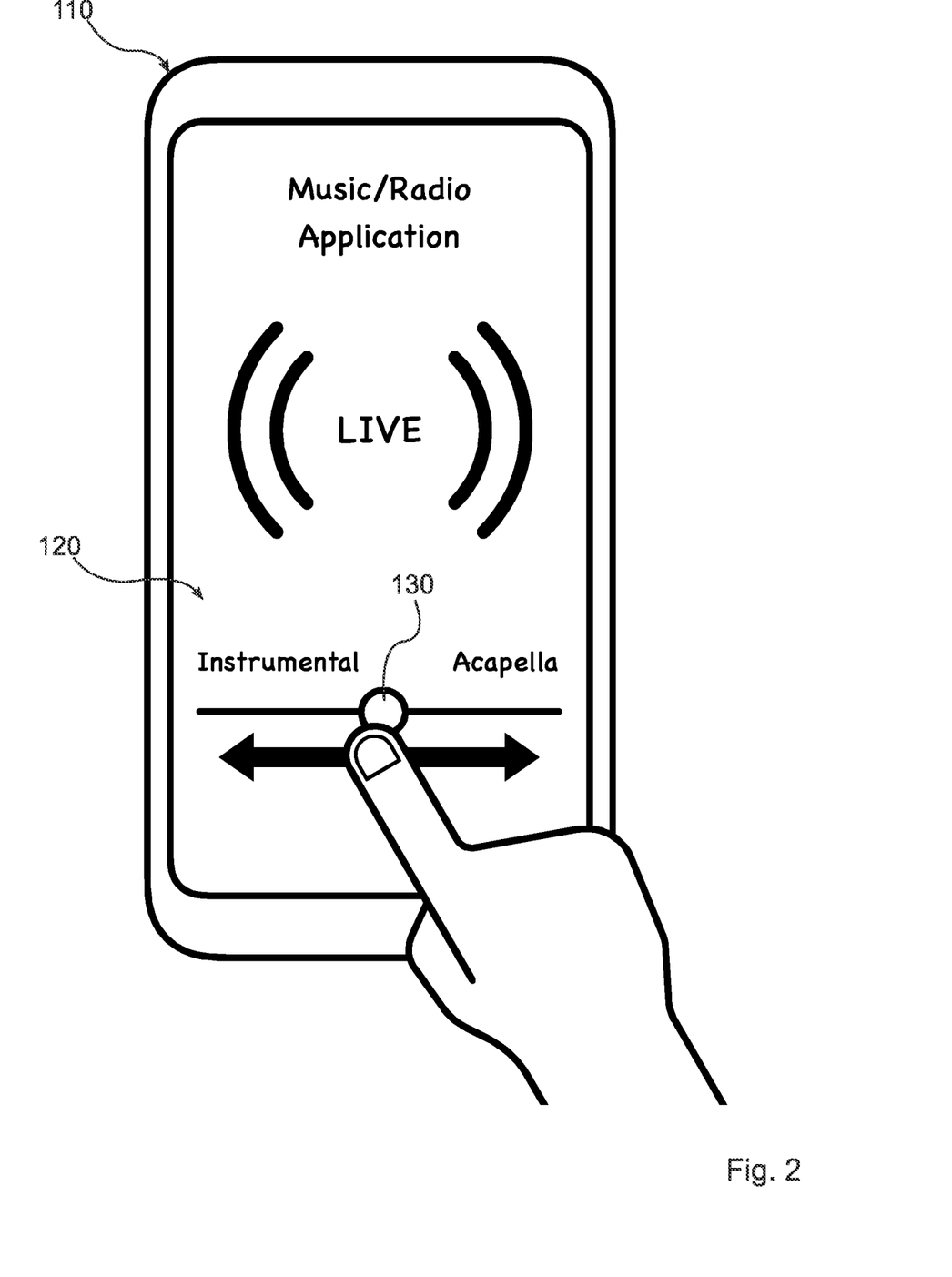
FIG. 2 shows a device according to a second embodiment of the present embodiment of the present invention.

A device 110 according to a second embodiment of the present invention is formed by a tablet computer or a smartphone which comprises standard hardware components such as input/output ports, wireless connectivity, a housing, a touchscreen, an internal storage as well as a plurality of microprocessors. Essential features of the present invention are implemented in device 110 by means of a suitable piece of software such as a suitable application run on device 110.

A continuous stream of mixed audio data, such as a livestream, is preferably received in real time from a remote audio source, in particular via a mobile network. For example, a stream of music may be received over the Internet via a Wi-Fi or GSM network. A controlling section 120 is implemented by a suitable display of knobs or faders which can be operated by a user through a touch gesture or the like. In the illustrated example of FIG. 2, a control element 130 is provided which allows blending between a decomposed instrumental track and a decomposed vocal track (acapella), for example by sliding a virtual fader through a sliding touch gesture.

Figure 3:
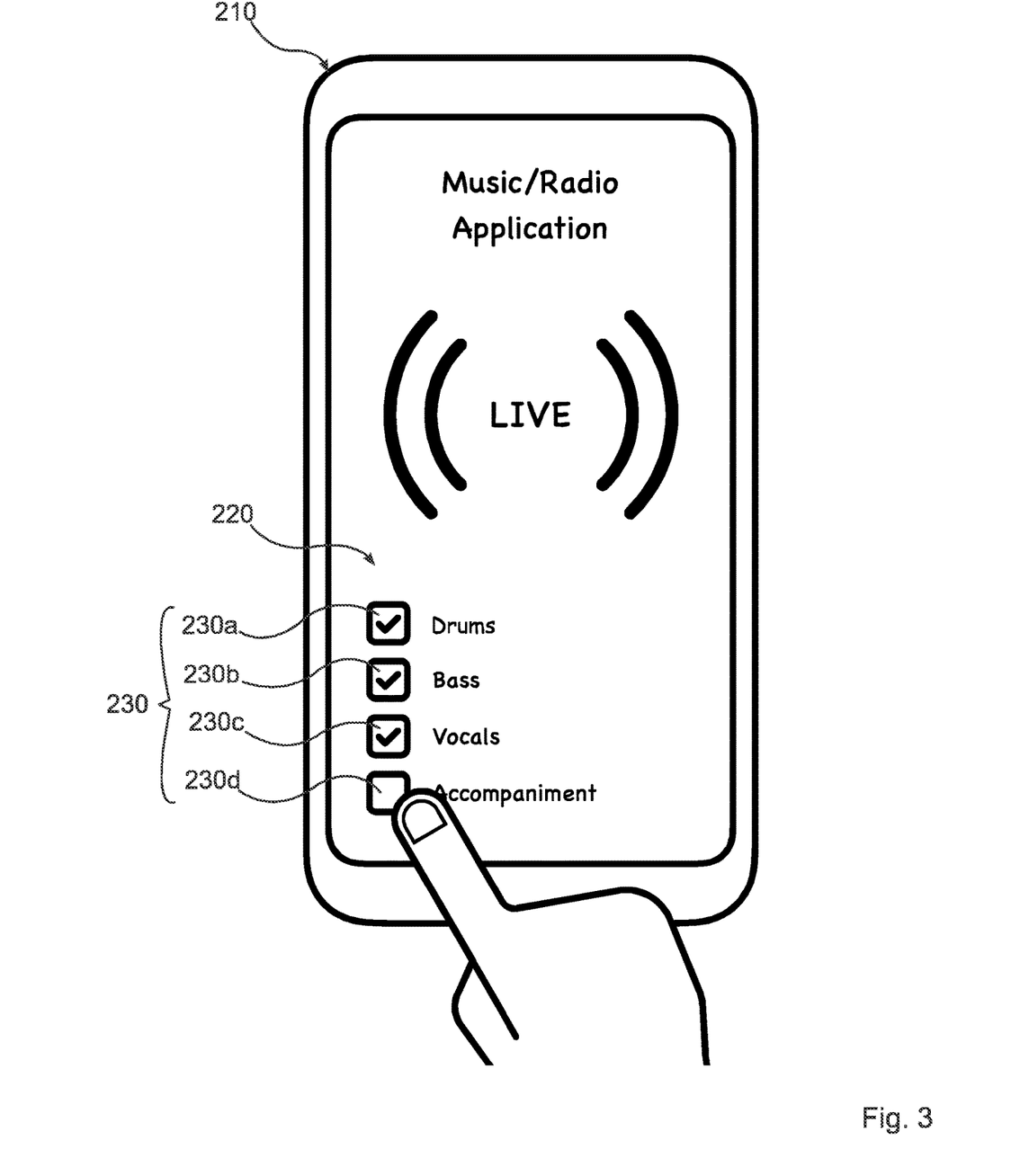
FIG. 3 shows a device according to a third embodiment of the present invention.

In a third embodiment shown in FIG. 3, a device 210 is a modification of device 110 of the second embodiment. Only differences with respect to the first embodiment will be described in the following and all other features and effects of the second embodiment may be implemented in the third embodiment in the same manner, if desired.

In the third embodiment, the controlling section 220 comprises a plurality of control elements 230, each of which allows controlling a different decomposed track of a different timbre. In the illustrated example, a first control element 230a controls playback of a decomposed drum track, a second control element 230b controls playback of a decomposed bass track, a third control element 230c controls playback of a decomposed vocal track and a fourth control element 230d controls playback of an accompaniment track. In a preferred example, drum track, bass track, vocal track and accompaniment track can be complements, such that their sum is substantially equal to the original mixed audio data.

Preferably, the control elements 230 are realized by on-off switches such as check boxes to mute (set volume level to 0 percent) or unmute (set volume level to 100 percent) playback of the respective decomposed track.

Figure 4:
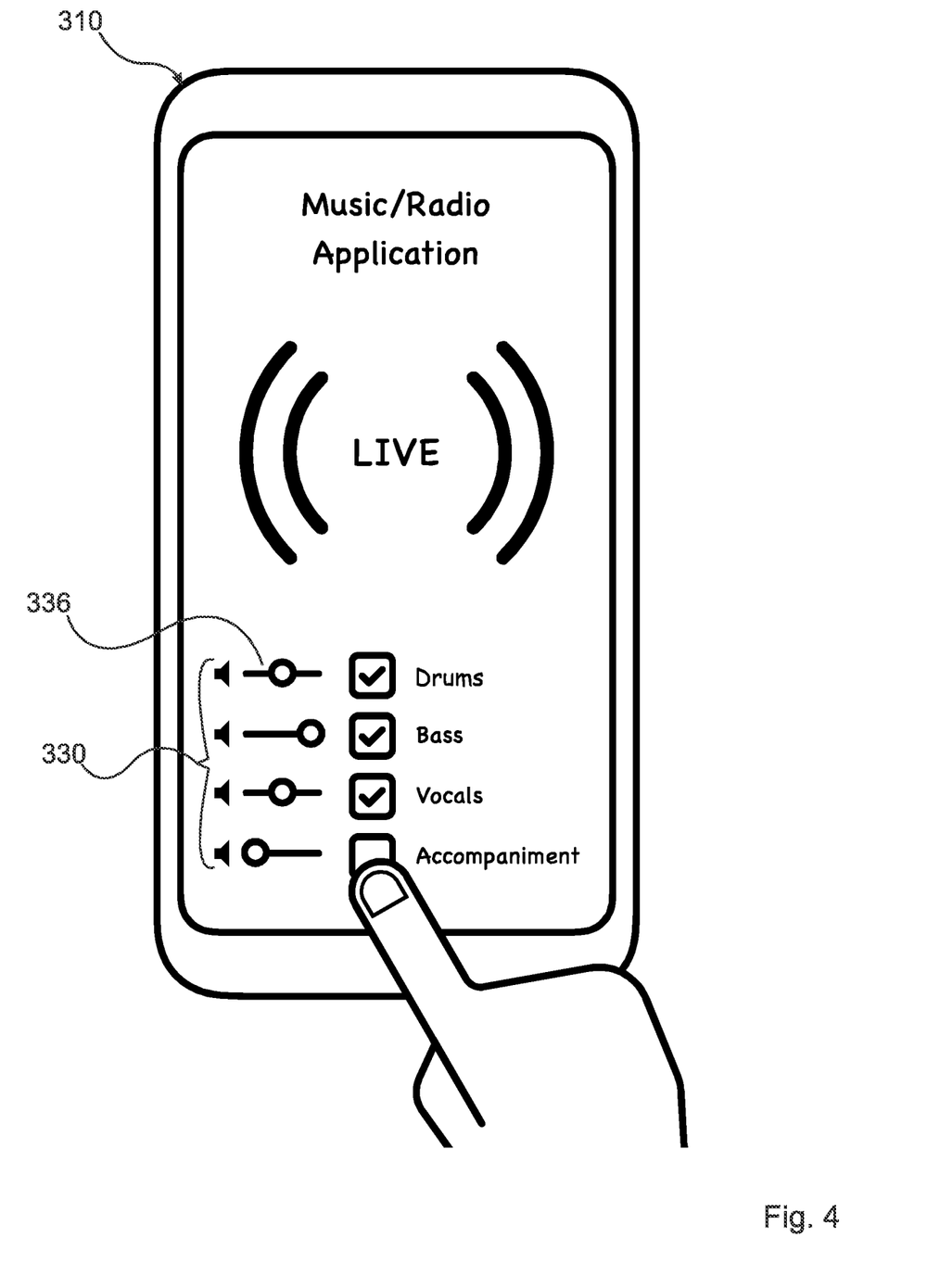
FIG. 4 shows a device according to a fourth embodiment of the present invention.

FIG. 4 shows a fourth embodiment of the present invention which is a further modification of the third embodiment. Only differences with respect to the third embodiment will be explained. The features described above for the third embodiment may be adopted in the same manner for the fourth embodiment.

The device 310 of the fourth embodiment comprises a plurality of control elements 330 in the same or corresponding manner as control elements 230 of the third embodiment, wherein in the fourth embodiment each control element 330 additionally includes a volume control element 336 for controlling the volume of the individual decomposed track. The volume control elements 336 may be implemented by a (virtual) fader or a rotatable knob. They may further each have a mute button allowing to completely mute playback of the respective decomposed track upon the touch of the button. Control elements 330 may in the same or corresponding manner be integrated in a device 10 of the first embodiment.

Figure 5:
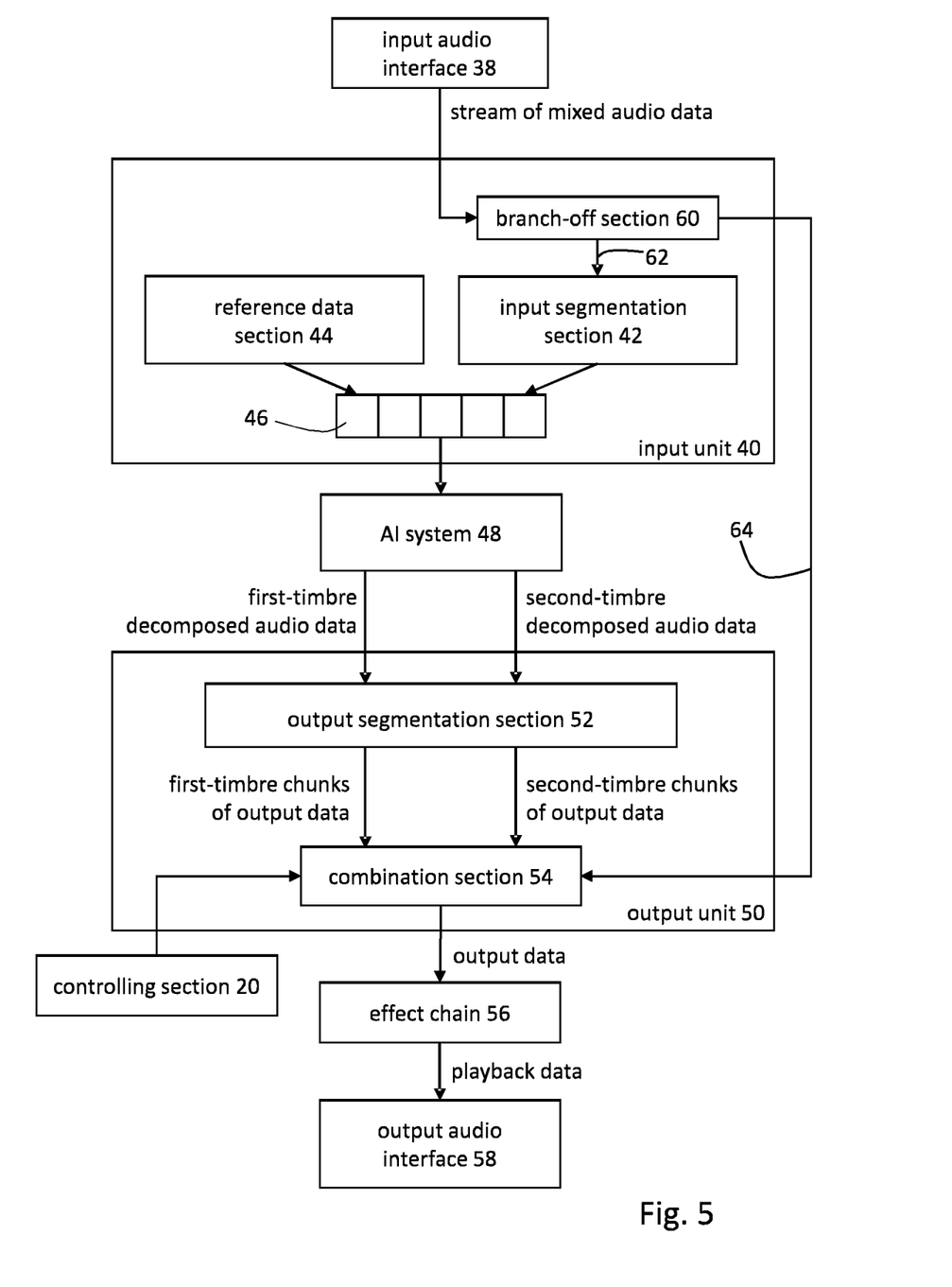
FIG. 5 shows a schematic view of components included in a device according to any of the first to fourth embodiments.

The internal components of the devices 10, 110, 210 and 310 according to the first to fourth embodiments described above will now be described by way of example based on FIG. 5 for device 10 of the first embodiment. The same features and effects equally apply for any of the other embodiments.

Connected to input port 12 may be an input audio interface 38 including an analog-to-digital-converter for converting the analog signals received at input port 12 into a stream of digital data. The digitized stream, of mixed audio data is then received in an input unit 40.

Input unit 40 may include a branch-off section 60, which lets a stream of mixed audio data pass through as a first stream 62 and branches off a bypass signal or bypass stream as a second stream 64. Branch-off section 60 may simply copy or split the stream of mixed audio data received from the input audio interface 38 to obtain two equal streams 62 and 64.

Input unit 40 may contain an input segmentation section 42, a reference data section 44 and a buffer 46. Input segmentation section 42 receives the stream of mixed audio data from branch-off section 60 or directly from input audio interface 38, extracts chunks of predetermined length from the stream of mixed audio data and writes the chunks into buffer 46. Furthermore, reference data section 44 writes reference data into buffer 46 such as to fill up the remainder of buffer 46 which is not (yet) fully filled with chunks of the stream of mixed audio data.

Buffer 46 is then transferred to an AI system 48 which forms a decomposition unit in the sense of the present invention. AI system 48 comprises a neural network trained to separate from the incoming mixed audio data decomposed audio data of a first timbre as well as decomposed audio data of a second timbre. For example, the first timbre may be a vocal timbre and the second timbre may be an instrumental timbre. Alternatively, only one timbre may be extracted by AI system 48 or more than two timbres or different timbres may be extracted, if a corresponding AI system 48 specifically trained for the respective timbre or timbres is used.

In the present example, first-timbre decomposed audio data and second-timbre decomposed audio data are then transferred to an output unit 50 for generating output data. Output unit 50 may comprise an output segmentation section 52 which extracts consecutive chunks from the decomposed audio data. In particular, output segmentation section 52 may extract first-timbre chunks of output data from the first-timbre decomposed audio data and second-timbre chunks of output data from the second-timbre decomposed audio data, respectively. If two or more timbres are extracted such as in the illustrated example, a combination section 54 may then be used to combine the chunks of different timbres to receive chunks of output data. Alternatively, the combination section 54 may be arranged between the AI system 48 and the output segmentation section 52 such as to combine the first-timbre decomposed audio data and the second-timbre decomposed audio data to generate combined decomposed audio data, wherein the combined decomposed audio data are then introduced into the output segmentation section 52 to generate chunks of output data.

The chunks of output data are then consecutively chained one after another to produce a continuous stream of decomposed output data with correct timing corresponding to the incoming stream of mixed audio data.

If the device includes a branch-off section 60 as mentioned above, combination section 54 may further receive the second stream 64 (the bypass signal or bypass stream) and may be configured to output either the decomposed output data as mentioned above, or the second stream 64, or a combination/mixture of the decomposed output data and the second stream 64. As can be seen in FIG. 5, the second stream 64 bypasses the AI system 48, i.e. is not processed within the AI system 48. Depending on the processing speed of the AI system there might occur a time shift (phase shift) between the availability of decomposed output data and the second stream 64. In order to accurately combine both streams, combination section 54 may comprise a time shifter to introduce an intentional latency, for example silence for a certain amount of time, into the second stream 64 to match its timing to that of the decomposed output data.

Combination section 54 is preferably controlled by controlling section 20 (or 120, 220) adapted to be controlled by a user as mentioned above to generate a control input, preferably comprising a first control parameter relating to the output of the first-timbre chunks of output data, a second control parameter relating, to the output of the second-timbre chunks of output data, wherein the first and second control parameters are preferably first and second play/mute values and/or first and second volume levels associated to the first- and second-timbre chunks of output data, respectively.

Furthermore, controlling section 20 may comprise a bypass control section and the control input generated by the control section 20 based on user input may include a bypass control parameter controlling the combination section 54 to selectively output either the decomposed output data or the second stream 64, or a combination thereof. In particular the bypass control parameter may include a play/mute value or a volume value associated to the second stream 64, and/or may include a play/mute value or a volume value associated to the decomposed output data.

The stream of output data obtained in this manner may then be passed through an effect chain 56 to apply certain audio effects known as such, for example delay, reverb, equalizer etc. One or more effect chains may also or alternatively be arranged at another position in the device, for example between input audio interface 38 and input unit 40, and/or anywhere within the bypass stream, and/or between the output segmentation section 52 and the combination section 54, and/or at any other position within the audio processing chain of the device.

The output data or playback data will then be transmitted to an output audio interface 58 which is adapted to play the stream of output data/playback data through output port 22. Output audio interface 58 preferably comprises a digital-to-analog converter. With the configuration illustrated in FIG. 5, a method according to an embodiment of the present invention can be carried out which will be explained in the following with respect to FIGS. 6 and 7.

Figure 6:
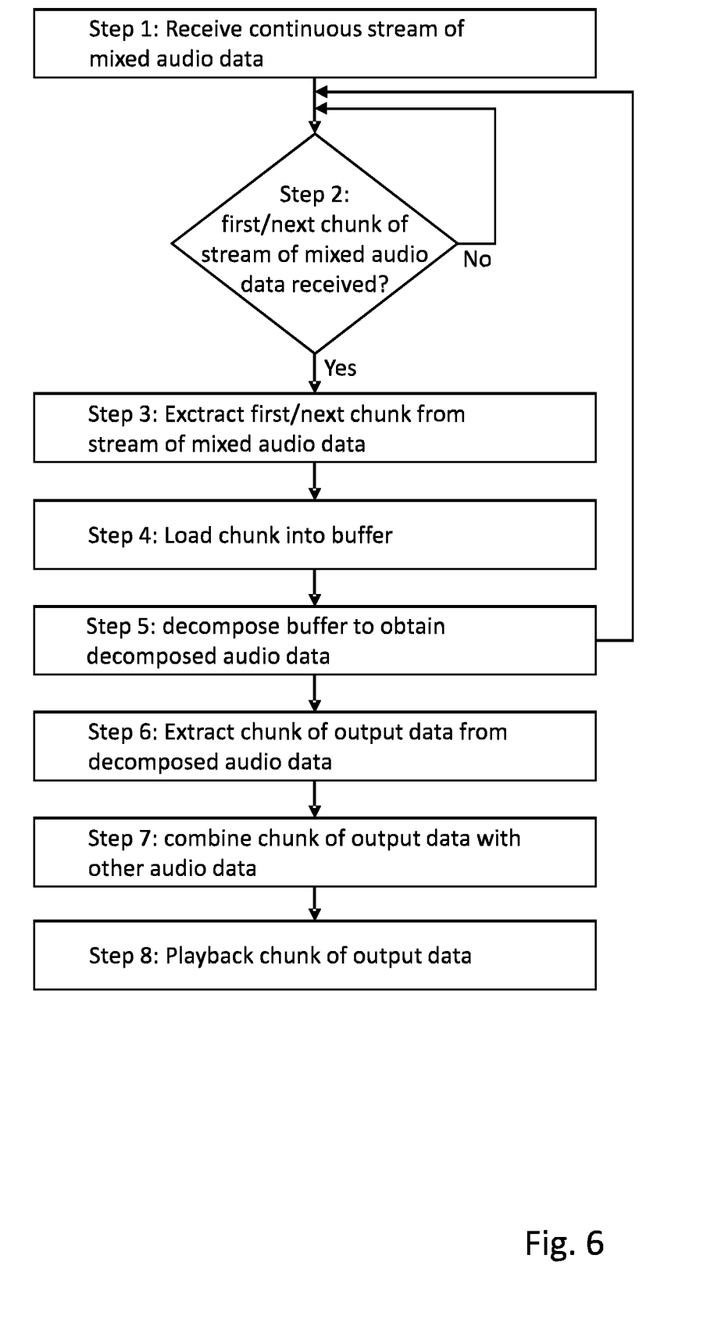
FIG. 6 shows a flowchart of a method of the present invention as implemented in any of the first to fourth embodiments.

In step 1 of the method, a continuous stream of mixed audio data is received, in particular via input audio interface 38, via a live internet stream or from within a host application (if the method runs as a plugin, for example an Audio Unit or VST plugin). In step 2, the process waits until a sufficient amount of data of the stream of mixed audio data is received to form a first or a next chunk. If a first/next chunk can be formed, such chunk is extracted from the stream of mixed audio data in step 3, and the process proceeds further to step 4. In step 4, the extracted chunk is loaded into buffer 46. In the following step 5, the buffer is decomposed within AI system 48 in order to obtain decomposed audio data, for example first-timbre decomposed audio data and second-timbre decomposed audio data. When decomposition in step 5 is finished, AI system 48 is in principle ready for decomposing the next data. Thus, on the one hand, the process returns to the beginning of step 2 and thus waits for the next chunk of the stream of mixed audio data to be received in order to repeat steps 3 to 5 and to generate decomposed audio data for the next chunk. On the other hand, when decomposed audio data are obtained in step 5, the process proceeds to step 6 to extract a chunk of output data from the decomposed audio data. After optionally combining the chunk of output data with any other audio data in step 7, for example by using combination section 54 as explained above, or optionally applying some audio effects through effect chain 56, the chunk of output data extracted in step 6 will be played by the output audio interface 58 in step 8.

One should note the splitting of the process after step 5. This means that a chunk of output data is forwarded towards playback in step 8 and, at the same time, the process extracts a next chunk from the incoming stream of mixed audio data, loads it into the buffer and decomposes the buffer to obtain the next chunk of output data. This allows starting playback of the output data immediately, in particular after processing the first chunk, while ensuring a continuous stream of output data that can be played in real time without gaps.

Figure 7:
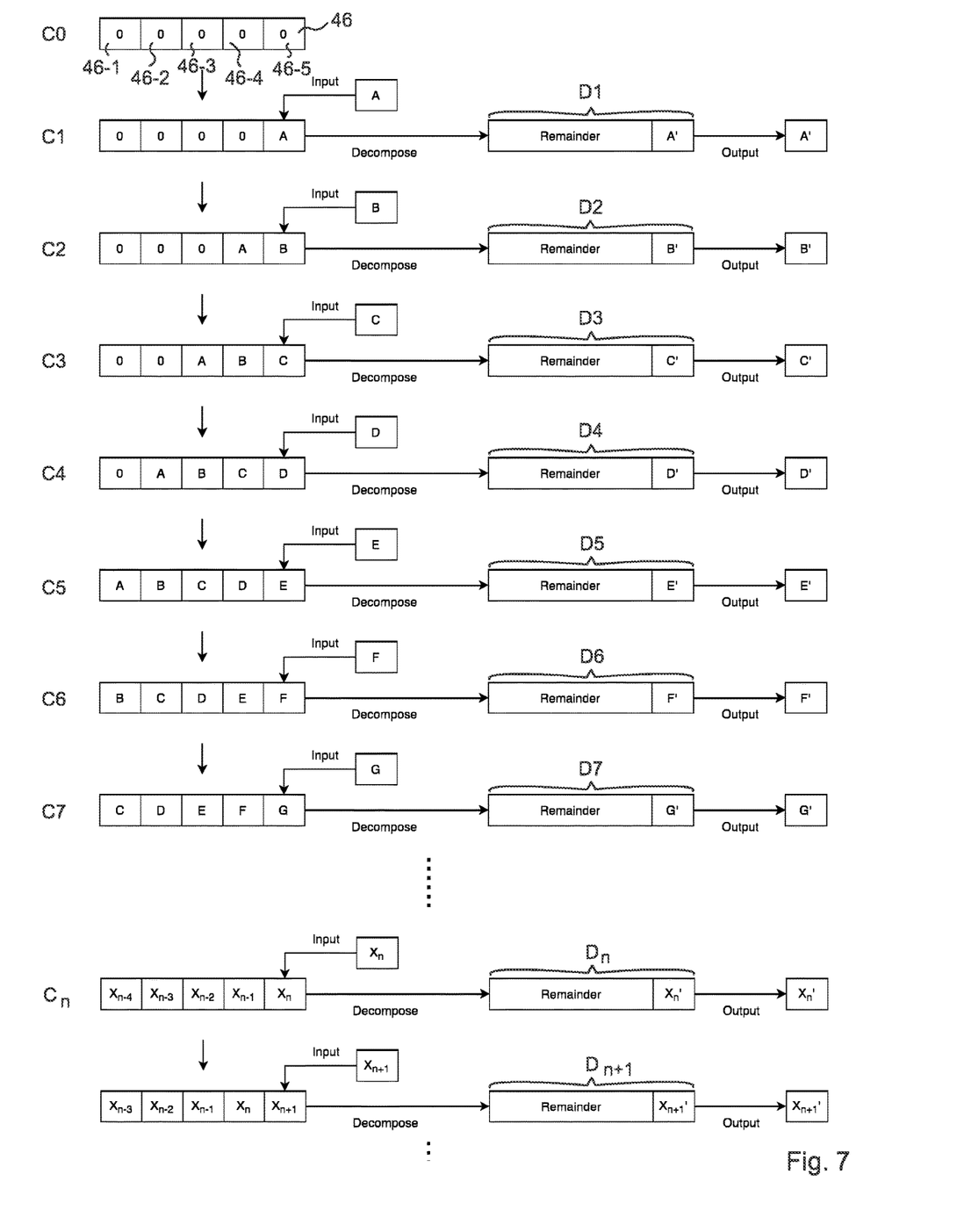
FIG. 7 shows a diagram illustrating further details of the method shown in FIG. 6.

FIG. 7 shows an example of a process for sequentially filling buffer 46 with consecutive chunks of the stream of mixed audio data in input unit 40. At the very beginning of processing of a new stream of mixed audio data, in a cycle C0, buffer 46 is completely filled with reference data. Reference data may be predetermined equal data, such as Zeros, which represent silence when interpreted as an audio signal. Other data may be used as reference data as long as the AI system 48 is suitably configured to understand such data as reference data and not containing actual data from the stream of mixed audio data.

In the illustrated example of FIG. 7, buffer 46 has five buffer sections 46-1, 46-2, 46-3, 46-4, 46-5 for storing five individual elements of audio data. The size of the chunks and the size of the buffer sections are respectively chosen such that each buffer section 46-1 to 46-5 is adapted to store therein exactly one chunk of the stream of mixed audio data. Of course, the number of buffer sections used in the example of FIG. 7 is just an example and buffer 46 may have any other number of buffer sections, in particular any number of buffer sections that is suitable for operation of a particular AI system 48 used in the device. For example, buffer 46 may have 100 buffer sections, each having a size to store chunks of 100 milliseconds length.

Buffer 46 is a FIFO (first-in-first-out) buffer, which is adapted to be sequentially filled with consecutive chunks A, B, ... of the stream of mixed audio data and the remainder being filled with predetermined reference data such as to form a queue of data, said queue having a constant length (here five data elements stored in five buffer sections 46-1 ... 46-5), wherein data are enqueued at the tail of the buffer (here at the fifth buffer section 46-5), while data are dequeued at the head of the buffer (here at the first buffer section 46-1).

Thus, in a first cycle C1 which follows cycle C0, a first chunk A of the stream of mixed audio data is filled into the last buffer section 46-5 and the buffer 46 is updated such as to shift and dequeue (discard) the data element in the first buffer section 46-1. In cycle C1 the dequeued data element is a piece of reference data, i.e. a zero.

Furthermore, in the first cycle C1, the resulting buffer containing only the first chunk A and the remainder being filled with zeros is decomposed to obtain decomposed audio data D1 which contain an element. A' corresponding to the decomposition the first chunk. A, and the remainder corresponding to the decomposition result of the reference data. Element A' will then be extracted and output as a chunk A' of output data for further processing, in particular playback. As can be seen, decomposition will be based on a buffer containing only one chunk A and the remainder being reference data, such that audio quality of the first output chunk A' may be limited at cycle C1.

As soon as a second chunk B of the stream of mixed audio data is available and extracted from the incoming stream, in cycle C2 the new chunk. B is written into the last buffer section 46-5 of buffer 46, whereupon buffer 46 shifts to the left by one buffer section, such that the first chunk A is now stored in the penultimate buffer section 46-4, the second chunk B is stored in the last buffer section 46-5 and the remainder of the buffer 46, i.e. the first three buffer sections 46-1, 46-2 and 46-3, are still filled with reference data. Buffer 46 is then decomposed to obtain second decomposed data. D2, wherein an element B' of the second decomposed data D2 corresponds to the decomposition result of the second chunk B of the mixed audio data, and the remainder of the second decomposed audio data corresponds to the decomposition result of the first chunk A and the remaining zeros in buffer 46. Element. B' is then extracted as a second chunk B' of output data and is made available for further processing and in particular playback.

It should be noted that although the second output chunk B' corresponds to the decomposition result of the second chunk B of the input stream of mixed audio data, the decomposition process itself as carried out in the AI system 48 in cycle C1 has taken into account the entire content of buffer 46, i.e. both chunks A and B of the input stream as well as the reference data. This means that the performance of the AI system 48 and in particular its accuracy as regards the extraction of the predetermined timbre and thus the audio quality of the extracted output chunk B' is already much improved as compared to a hypothetical case where only the second chunk B of the stream of mixed audio data would be input into AI system 48 in this cycle.

When the process continues in this manner through cycles C3, C4, ..., CN in each cycle a new chunk C, D, ..., $X_n$ will be written into the last buffer section 46-5 of buffer 46, whereupon buffer 46 is shifted towards the first buffer section 46-1 and the data element contained in the first buffer section 46-1 is dequeued. As soon as all reference data are dequeued from buffer 46, all buffer sections 46-1 . . . 46-5 are filled with consecutive chunks of the incoming stream of mixed audio data. This means that in any later cycle No. n, a current chunk $X_n$ is filled in the last buffer section 46-5 and the buffer is shifted such that it contains the current chunk $X_n$ and a corresponding number of previous chunks, in particular previous chunks $X_{n-1}$, $X_{n-2}$, $X_{n-3}$ and $X_{n-4}$. After decomposition of the so filled buffer 46, the decomposed audio data Dn will contain a data element. $X'_n$ which corresponds to the decomposition result of the current chunk $X_n$ of the input stream, and a remainder corresponding to decomposed audio data of the previous chunks. However, in the processing of the data within the AI system 48 in the current cycle Cn, the AI system 48 will carry out its analysis on the basis of all chunks $X_n$ . . . $X_{n-4}$ contained in buffer 46 such that audio quality of the output chunk $X'_n$ (accuracy of recognition or separation of the specific timbre) is increased by a multitude as compared to a hypothetical case where only one chunk $X_n$ would be analyzed/decomposed by AI system 48. Accordingly, audio quality will increase rapidly from cycle to cycle and will reach a high level after only a few cycles.

Output unit 50 will then be able to sequentially play the extracted chunks A', B', C', $X'_n$, i.e. to form a continuous stream of output data or playback data for playback without any gaps or breaks.

The invention claimed is:

1. A method for processing mixed audio data, comprising the steps of:
   receiving a continuous input stream of mixed audio data, wherein the mixed audio data was produced by mixing a plurality of source tracks of different timbres during production or live transmission of music, wherein the plurality of source tracks comprise a first source track of a first timbre comprising first audio signals that originated from a first musical instrument, and a second source track of a second timbre comprising second audio signals that originated from a second musical instrument or from a vocal component;
   loading a first chunk of the input stream into a buffer such that the buffer contains audio data comprising the first chunk of the input stream and at least one of a previous chunk of the input stream or predetermined reference data, wherein a size of the buffer is larger than a size of the first chunk of the input stream;
   decomposing the audio data contained in the buffer to obtain first decomposed audio data representing the first audio signals of the first timbre and second decomposed audio data representing the second audio signals of the second timbre, wherein the decomposing comprises processing the audio data contained in the buffer using a neural network trained to separate audio data of predetermined timbres from mixed audio data;
   generating a first chunk of output data comprising the first decomposed audio data and the second decomposed audio data;
   beginning playback of the first chunk of output data;
   loading a second chunk of the input stream of mixed audio data into the buffer such that the audio data contained in the buffer comprises the second chunk of the input stream, the first chunk of the input stream and at least one of the previous chunk of the input stream or the predetermined reference data;
   decomposing, using the neural network, the audio data contained in the buffer comprising the second chunk of the input stream, the first chunk of the input stream and at least one of the previous chunks of the input stream or the predetermined reference data to obtain additional first decomposed audio data representing the first audio signals of the first timbre and additional second decomposed audio data representing the second audio signals of the second timbre;
   generating a second chunk of output data corresponding to the second chunk of the input stream comprising at least part of the additional first decomposed audio data and the additional second decomposed audio data;
   continuing playback of the first chunk of output data followed by the second chunk of output data as a continuous stream of output data while continuing to receive the continuous input stream of mixed audio data; and
   during playback, receiving control data comprising a first control parameter relating to the first audio signals of the first timbre and a second control parameter relating to the second audio signals of the second timbre,
      wherein the first control parameter allows a user to perform at least one of starting or stopping playback of the first audio signals, changing a volume of the first audio signals, muting or unmuting the first audio signals or applying audio effects to the first audio signals, and
      wherein the second control parameter allows the user to perform at least one of starting or stopping playback of the second audio signals, changing a volume of the second audio signals, muting or unmuting the second audio signals or applying audio effects to the second audio signals.

2. The method of claim 1, wherein the buffer is a First-In-First-Out-buffer which is sequentially filled to form a queue of data, said queue having constant length, wherein data are enqueued at a tail of the buffer, and wherein data are dequeued at a head of the buffer.

3. The method of claim 2, further comprising filling the First-In-First-Out-buffer with the predetermined reference data prior to loading the first chunk of the input stream into the First-In-First-Out-buffer;
   wherein loading the first chunk of the input stream into the buffer comprises enqueuing the first chunk of the input stream at the tail of the First-In-First-Out-buffer; and
   wherein loading the second chunk of the input stream into the buffer comprises enqueuing the second chunk of the stream of mixed audio data at the tail of the First-In-First-Out-buffer after moving the first chunk of the input stream towards the head of the First-In-First-Out-buffer.

4. Method of claim 1, further comprising:
   loading an nth chunk of the input stream of the mixed audio data into the buffer such that the audio data contained in the buffer comprises the nth chunk of the input stream and a plurality of previous chunks of the input stream;
   decomposing the audio data contained in the buffer to obtain nth decomposed audio data;
   generating an nth chunk of output data obtained from the nth decomposed audio data; and
   adding the nth chunk of output data to the continuous stream of output data.

5. The method of claim 1, wherein playback of the first chunk of output data or the second chunk of output data begins within a time smaller than five seconds after generating the first chunk of output data or the second chunk of output data, respectively.

6. The method of claim 1, wherein playback of the first chunk of output data or the second chunk of output data begins within a time smaller than 200 milliseconds after generating the respective first chunk of output data or the second chunk of output data.

7. The method of claim 1, further comprising starting playback of the first chunk of output data or the second chunk of output data within a time smaller than five seconds after loading the first chunk of the input stream into the buffer or the second chunk of the input stream into the buffer, respectively.

8. The method of claim 1, wherein the input stream of mixed audio data comprises an audio stream received from a playback device in play mode; and
wherein a latency between the input stream and the continuous stream of output data is smaller than five seconds.

9. The method of claim 1, wherein the input stream of mixed audio data comprises an audio stream received from a playback device in play mode; and
wherein a latency between the input stream and the continuous stream of output data is smaller than 200 milliseconds.

10. The method of claim 1, wherein the predetermined reference data comprises at least one of equal data or a neutral audio signal.

11. A device for processing mixed audio data, comprising
an input unit adapted to receive a continuous input stream of mixed audio data, extract consecutive chunks of the input stream, and sequentially load each consecutive chunk into a buffer, wherein the mixed audio data was produced by mixing a plurality of source tracks of different timbres during production or live transmission of music, wherein the plurality of source tracks comprise a first source track of a first timbre comprising first audio signals that originated from a first musical instrument, and a second source track of a second timbre comprising second audio signals that originated from a second musical instrument or from a vocal component, and wherein a size of the buffer is larger than a size of a first chunk of the input stream;
a decomposition unit comprising an artificial intelligence system ("AI system") configured for decomposing audio data contained in the buffer to obtain decomposed audio data, the AI system comprising a neural network trained to separate audio data of predetermined timbres from mixed audio data;
a playing unit for playing a continuous stream of output data obtained from the decomposed audio data, wherein the continuous stream of output data comprises first decomposed audio data representing the first audio signals of the first timbre and second decomposed audio data representing the second audio signals of the second timbre; and
a controlling section for receiving, during playback, control data comprising a first control parameter relating to the first audio signals of the first timbre and a second control parameter relating to the second audio signals of the second timbre,
wherein the first control parameter allows a user to perform at least one of starting or stopping playback of the first audio signals, changing a volume of the first audio signals, muting or unmuting the first audio signals or applying audio effects to the first audio signals, and
wherein the second control parameter allows the user to perform at least one of starting or stopping playback of the second audio signals, changing a volume of the second audio signals, muting or unmuting the second audio signals or applying audio effects to the second audio signals; and
wherein the device is adapted to carry out playback of the continuous stream of output data via the playing unit while receiving the stream of mixed audio data via the input unit.

12. The device of claim 11, wherein the latency of the playback of the stream of output data with respect to the input stream of mixed audio data is smaller than five seconds.

13. The device of claim 11, wherein a latency of the playback of the stream of output data with respect to the input stream of mixed audio data is smaller than 200 milliseconds.

14. A device for processing mixed audio data, comprising:
an input unit adapted to receive a continuous input stream of mixed audio data, wherein the mixed audio data was produced by mixing a plurality of source tracks of different timbres during production or live transmission of music, wherein the plurality of source tracks comprise a first source track of a first timbre comprising first audio signals that originated from a first musical instrument, and a second source track of a second timbre comprising second audio signals that originated from a second musical instrument or from a vocal component;
a buffer for storing audio data comprising consecutive chunks of the continuous input stream of mixed audio data, wherein a size of the buffer is larger than a size of each of the chunks;
a decomposition unit comprising an artificial intelligence system ("AI system") configured for decomposing the audio data contained in the buffer to obtain decomposed audio data, the AI system comprising a neural network trained to separate audio data of predetermined timbres from mixed audio data,
an output unit connected to the decomposition unit for generating consecutive chunks of a continuous stream of output data obtained from the decomposed audio data while continuing to receive the continuous input stream of mixed audio data, the continuous stream of output data including first decomposed audio data representing the first audio signals of the first timbre and second decomposed audio data representing the second audio signals of the second timbre; and
a controlling section for receiving control data comprising a first control parameter relating to the first audio signals of the first timbre and a second control parameter relating to the second audio signals of the second timbre.

15. The device of claim 14, wherein the buffer is a First-In-First-Out-buffer which is adapted to be sequentially filled with consecutive chunks of the input stream of mixed audio data to form a queue of data, said queue having constant length, wherein data are enqueued at a tail of the First-In-First-Out-buffer, and wherein data are dequeued at a head of the First-In-First-Out-buffer.

16. The device of claim 14, further comprising
a segmentation section for extracting consecutive chunks from the input stream of mixed audio data;

a reference data section providing predetermined reference data;

wherein the segmentation section and the reference data section are configured to fill the buffer with the consecutive chunks of the input stream of mixed audio data and to fill a remainder of the buffer, if any, with the predetermined reference data; and wherein the predetermined reference data comprises at least one of equal data or a neutral audio signal.

17. The device of claim 14, further comprising a playing unit for playing audio data based on consecutive chunks of output data, said playing unit comprising an audio interface for transmitting the played audio data to an internal speaker of the device or to an external sound system, wherein the device further comprises an audio effect unit arranged between the decomposition unit and the audio interface for generating audio effects, and wherein the first control parameter allows a user to apply a first audio effects to the first audio signals, and the second control parameter allows the user to apply audio effects to the second audio signals.

18. The device of claim 14, wherein the output unit comprises a combination section adapted to combine first output data obtained from the first decomposed audio data representing the first audio signals of the first timbre with second output data obtained from the second decomposed audio data representing the second audio signals of the second timbre.

19. The device of claim 14, wherein the input unit comprises a branch-off section adapted to branch-off a bypass signal from the input stream of mixed audio data, and a bypass arrangement configured to route the bypass signal towards the output unit while bypassing the decomposition unit, wherein the output unit is configured to generate a bypass output signal based on the bypass stream.

20. The device of claim 19, wherein the device further comprises a bypass control section which is controllable to selectively output either the output data obtained from the decomposed audio data or the bypass output signal, or a combination thereof.

21. The device of claim 14, wherein the first control parameter allows a user to perform at least one of starting or stopping playback of the first audio signals, changing a volume of the first audio signals, muting or unmuting the first audio signals or applying audio effects to the first audio signals, and the second control parameter allows the user to perform at least one of starting or stopping playback of the second audio signals, changing a volume of the second audio signals, muting or unmuting the second audio signals or applying audio effects to the second audio signals.

* * * * *